US012565256B2

(12) United States Patent
Yahagi

(10) Patent No.: US 12,565,256 B2
(45) Date of Patent: Mar. 3, 2026

(54) COLUMN COVER

(71) Applicant: TOYOTA JIDOSHA KABUSHIKI KAISHA, Toyota (JP)

(72) Inventor: Takuma Yahagi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 396 days.

(21) Appl. No.: 18/207,319

(22) Filed: Jun. 8, 2023

(65) Prior Publication Data

US 2023/0398954 A1 Dec. 14, 2023

(30) Foreign Application Priority Data

Jun. 10, 2022 (JP) ................................. 2022-094302

(51) Int. Cl.
*B62D 1/19* (2006.01)
*B60R 13/02* (2006.01)
*B62D 1/16* (2006.01)
*B62D 25/14* (2006.01)

(52) U.S. Cl.
CPC .............. B62D 1/192 (2013.01); B60R 13/02 (2013.01); B60R 13/0275 (2013.01); B62D 1/16 (2013.01); B62D 25/145 (2013.01)

(58) Field of Classification Search
CPC .......... B62D 1/16; B62D 1/192; B62D 1/185; B62D 1/11; B62D 24/14; B62D 24/145; B60R 13/02; B60R 13/0275; B60R 13/0256
See application file for complete search history.

(56) References Cited

U.S. PATENT DOCUMENTS

2009/0033083 A1* 2/2009 Kobayashi ............... B62D 1/16
280/779
2019/0283794 A1* 9/2019 Nagai .................... B62D 1/195

FOREIGN PATENT DOCUMENTS

| CN | 114954620 A | * | 8/2022 | ............... B62D 1/16 |
| EP | 1207094 A1 | * | 5/2002 | ............. B62D 1/195 |
| FR | 2927875 A1 | | 8/2009 | |
| JP | S51-048233 U | | 4/1976 | |
| JP | H11-222138 A | | 8/1999 | |
| JP | 2000-159125 A | | 6/2000 | |
| JP | 2001063590 A | * | 3/2001 | |
| JP | 2014-129011 A | | 7/2014 | |

* cited by examiner

*Primary Examiner* — Daniel J Colilla
(74) *Attorney, Agent, or Firm* — Dinsmore & Shohl LLP

(57) ABSTRACT

A column cover surrounding and covering a steering column includes a cover body and a detachable member disposed further forward relative to the cover body and fastened to the cover body, with a clip, to allow the detachable member to be continuous with the cover body. The detachable member is disposed behind an instrument panel R/F and faces the instrument panel R/F with an interval along a length of a vehicle between the detachable member and the instrument panel R/F.

5 Claims, 8 Drawing Sheets

COLUMN COVER

CROSS REFERENCE TO RELATED APPLICATION

This application claims priority to Japanese Patent Application No. 2022-094302 filed on Jun. 10, 2022, which is incorporated herein by reference in its entirety including the specification, claims, drawings, and abstract.

TECHNICAL FIELD

The present specification discloses a column cover that surrounds and covers a steering column.

BACKGROUND

Typically, a steering wheel is coupled with a shaft member called a steering column, and a periphery of the steering column is covered with a column cover which typically has a cylindrical shape. Further, an instrument panel has an opening to allow this column cover to pass through.

An instrument panel space is created in a region at the back of the instrument panel or further forward of a vehicle seen from a driver, and an instrument panel reinforcement, which will be hereinafter referred to as an "instrument panel R/F", is disposed in this instrument panel space to reinforce the instrument panel. Opposite ends of the instrument panel R/F are fixed to a front pillar.

At the time of a frontal crash in which an obstacle crashes against the front of a vehicle, a front portion of the vehicle collapses to partially absorb collision energy. Sufficient collapse of the vehicle front portion causes the vehicle to stop, allowing an occupant to fall forward due to inertial force. This falling energy from the occupant is absorbed by a seatbelt or an airbag, while the force of the falling occupant pushing against the steering wheel is absorbed by the steering column contracting or moving forward. In the following description, a quantity of contraction or forward movement of the steering column for energy absorption will be referred to as an "EA stroke". To secure sufficient EA stroke, vehicles have conventionally included a space at the rear of the instrument panel R/F.

However, with design changes in the area around the instrument panel, the location of the instrument panel R/F has changed, and some vehicles include a column cover rearward of and close to the instrument panel R/F. This configuration fails to secure sufficient space at the back of the instrument panel R/F, leading to possible limitation of the EA stroke of the steering column in a frontal crash.

JP 2000-159125 A discloses a technique for preventing a driver from being subjected to a secondary collision with a steering wheel due to inertial force from a primary collision of a vehicle. More specifically, in JP 2000-159125 A, a column cover includes a protrusion to be engaged with the peripheral edge of an opening formed in the instrument panel to allow the column cover to pass, and, in the secondary collision, the protrusion is induced to break to release engagement between the protrusion and the peripheral edge of the opening. JP 2000-159125 A, however, nowhere discloses consideration of interference between the instrument panel R/F and the column cover and cannot address the above disadvantage.

The present specification therefore discloses a column cover that enables more reliable establishment of the EA stroke of a steering column in a frontal crash.

SUMMARY

In accordance with an aspect of the disclosure, a column cover surrounding and covering a steering column includes a cover body and a detachable member disposed further forward relative to the cover body and fastened to the cover body, with a fastener, to allow the detachable member to be continuous with the cover body. The detachable member is disposed behind an instrument panel reinforcement and faces the instrument panel reinforcement with an interval along a length of a vehicle between the detachable member and the instrument panel reinforcement.

This configuration facilitates release of fastening between the detachable member and the cover body in a frontal crash to allow the detachable member to be easily withdrawn from the column cover. Withdrawal of the detachable member further enables the steering column to contract or move forward by an extra amount corresponding to the dimension of the detachable member. This results in more reliable securing of the EA stroke of the steering column in a frontal crash in a configuration without a sufficient space between the instrument panel R/F and the column cover.

The column cover may be further configured such that no component of the column cover is disposed in at least one of a space above the detachable member or a space below the detachable member corresponding to a space along a withdrawing direction of the detachable member, and the cover body may include a contact face facing the detachable member and inclined to apply, to the detachable member, a reaction force in the withdrawing direction in response to reception of a vehicle rearward force from the detachable member.

This configuration facilitates the movement in the withdrawing direction of the detachable member that receives a collision load and impacts the contact face in a frontal crash. This allows further reliable withdrawal of the detachable member from the column cover.

In the above configuration, the column cover may include a column cover upper including the cover body and the detachable member to form an upper part of the column cover, and a column cover lower forming a lower part of the column cover, and the contact face may be inclined rearward and upward.

This configuration allows further reliable withdrawal of the detachable member from the column cover.

In the above configuration, the fastener may be a clip to be inserted and fitted in an engage hole disposed in at least one of the cover body or the detachable member, and the clip may be inserted in the engage hole in a direction opposite the withdrawing direction.

This configuration allows further reliable release of fastening between the detachable member and the cover body in a frontal crash, thereby allowing further reliable withdrawal of the detachable member from the column cover.

The cover body may include a plurality of projections protruding forward from a front end face of the cover body.

This configuration allows the projections to catch the instrument panel that impacts the cover body, to thereby avoid vertical sliding of the instrument panel R/F.

In this configuration, the plurality of projections may be integrally molded with the cover body, and a narrow notch may be disposed between two adjacent projections of the plurality of projections.

This configuration facilitates generation of cracks starting from the notch in collision of the instrument panel R/F with the projections and thus induces break of the cover body.

The break of the cover body results in securing of a greater EA stroke of the steering column.

The column cover disclosed in the present specification enables further reliable securing of the EA stroke of the steering column in a frontal crash.

BRIEF DESCRIPTION OF DRAWINGS

Embodiments of the present disclosure will be described based on the following figures, wherein.

DESCRIPTION OF EMBODIMENTS

Figure 1:
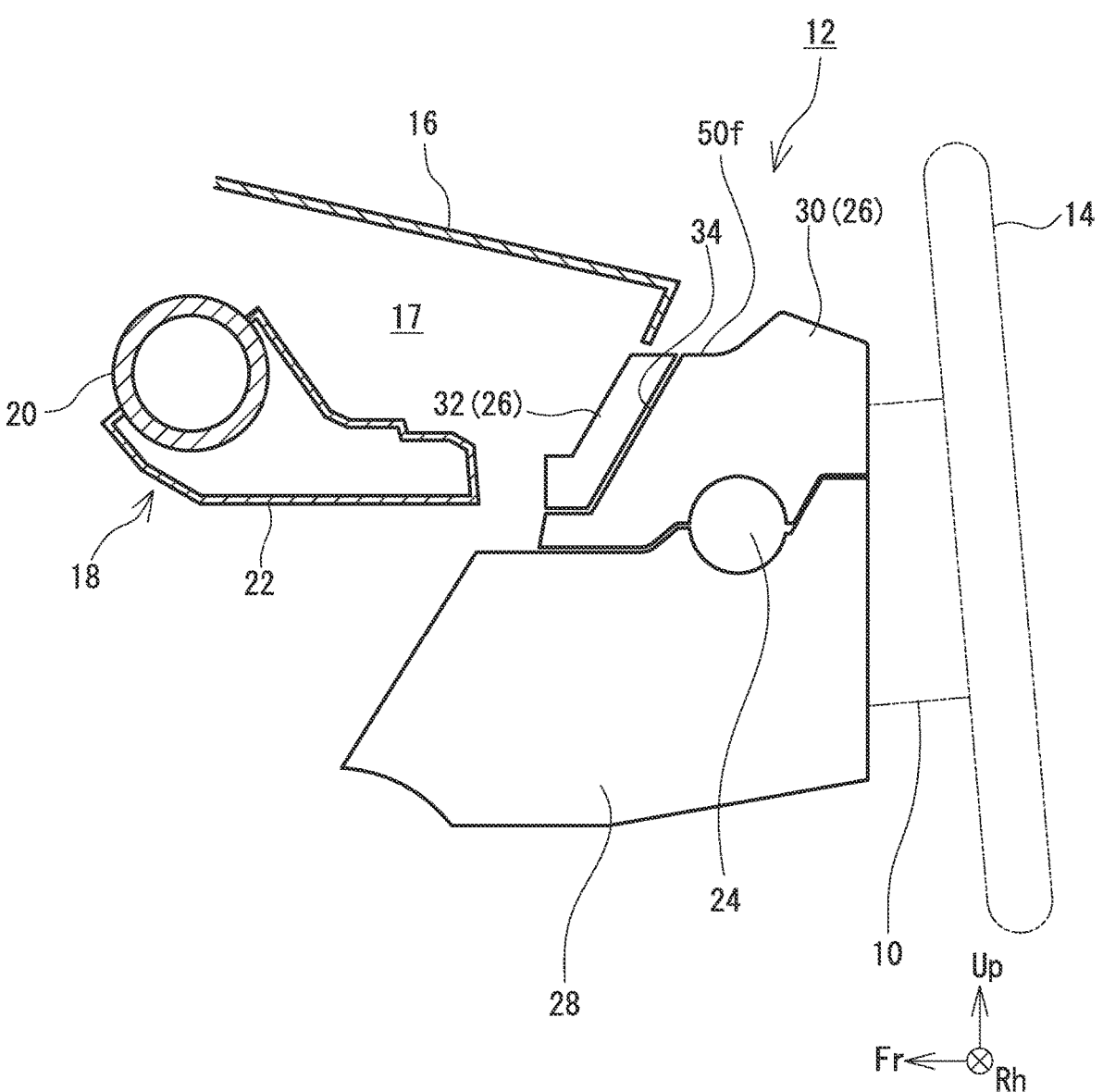
FIG. 1 is a side view of a column cover.

The configuration of a column cover 12 will be described below by reference to the drawings. FIG. 1 is a side view of the column cover 12. In FIG. 1, an instrument panel 16 and an instrument panel R/F 18, which are elongated members extending along a width of a vehicle, are shown as being cut in the middle. In each drawing, notation "Fr", "Up", and "Rh" indicates frontward, upward, and rightward, respectively, of the vehicle.

A steering wheel 14 is disposed forward of a driver's seat, and a shaft member called a steering column 10 is connected to the steering wheel 14. The column cover 12 is a cylindrical adornment that surrounds and covers the steering column 10.

The column cover 12 is a vertically separable cover and includes an upper column cover 26 and a lower column cover 28 disposed below the upper column cover 26. The upper column cover 26 is further separable longitudinally, and includes a cover body 30 and a detachable member 32 coupled to a front of the cover body 30. The purpose for separating the upper column cover 26 longitudinally will be described below. The column cover 12 includes, on its side face, a lever hole 24 to allow levers which are manipulated by a driver, such as a turn-signal lever, a wiper switch lever, and a shift lever, to pass through.

A front edge, or an edge further from the driver's seat, of the upper column cover 26 is covered with an instrument panel 16 from above. The instrument panel 16 is a panel member extending rearward of the vehicle from a lower end of a window shield glass (now shown). In the following description, a space under or in front of the instrument panel 16 will be referred to as an "instrument panel space 17".

An instrument panel R/F 18 extending along the width of the vehicle is disposed in the instrument panel space 17. The instrument panel R/F 18 is a reinforcing member that reinforces the instrument panel 16 and supports components mounted in the vicinity of the instrument panel 16. The instrument panel R/F 18 includes a pipe body 20, and an auxiliary member 22 fixed to the pipe body 20. Opposite ends of the pipe body 20 are joined to a front pillar (not shown). As illustrated in FIG. 1, the auxiliary member 22 protrudes further rearward of the vehicle relative to the pipe body 20. In this example, the auxiliary member 22 is located in front of the detachable member 32, and the auxiliary member 22 and the detachable member 32 face each other with an interval therebetween along the length of the vehicle.

Figure 2:
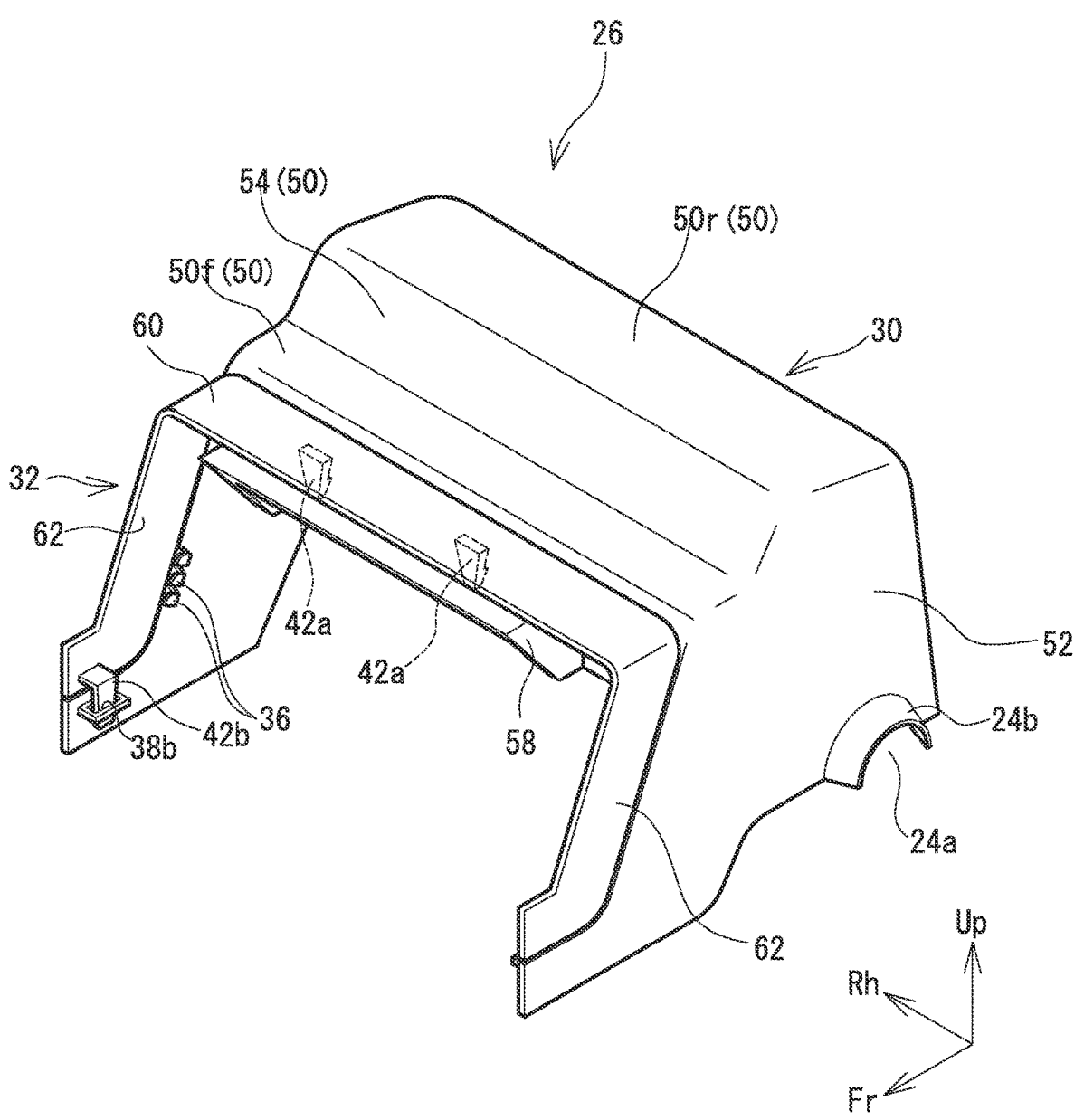
FIG. 2 is a perspective view of a column cover upper.
Figure 3:
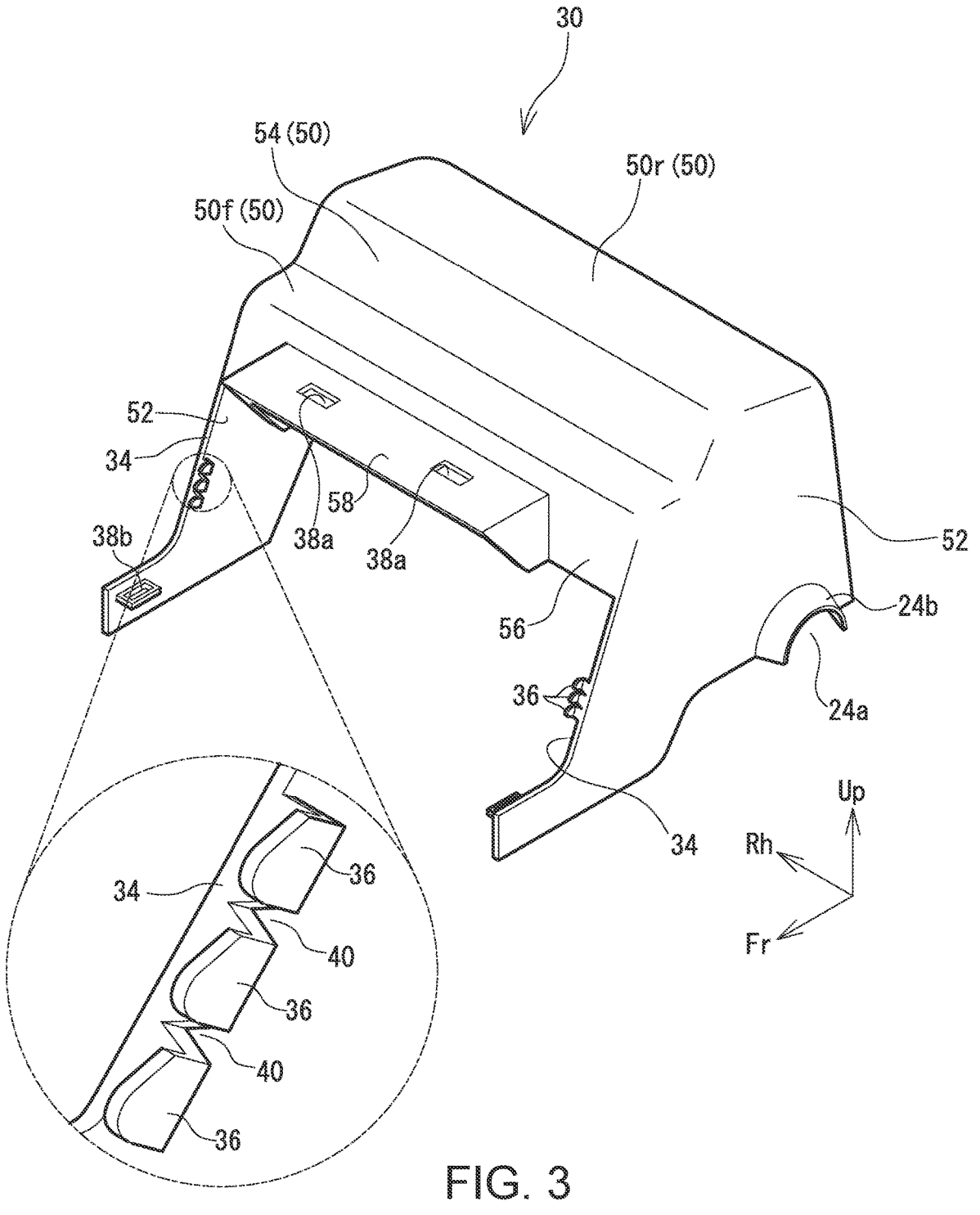
FIG. 3 is a perspective view of a cover body.

The configuration of the upper column cover 26 will be described in detail by reference to FIGS. 2 and 3. FIG. 2 is a perspective view of the upper column cover 26 and FIG. 3 is a perspective view of the cover body 30. The upper column cover 26 is a tunnel-shape member extending along the length of the vehicle. As described above, the column cover 12 (column cover upper 26) is generally divided into the cover body 30 and the detachable member 32 coupled to the front portion of the cover body 30.

The cover body 30 also includes a top face 50 and a pair of side faces 52 connected with opposite ends of the top face 50 along the vehicle width. The top face 50 of the cover body 30 has a step portion 54 such that a rear part 50r of the top face 50 is higher than a front part 50f of the top face 50. Further, a hanging wall 56 extending downward is connected with a front end of the top face 50, and a coupling portion 58 in an eave shape protrudes forward of the vehicle from this handing wall 56. The coupling portion 58 includes a plurality (two in the illustrated example) engage holes 38a passing through the coupling portion 58 vertically to allow clips 42a to be fitted therein, as will be described below.

The side face 52 of the cover body 30 includes, at a lower edge, a semicircular cut portion 24a that is part of the lever hole 24, and a semicircular rib 24b rises from a peripheral edge of the cut portion 24a toward the exterior of the cover. The greater part of the front edge of the side face 52 of the cover body 30 is inclined upward and rearward. A face of this inclined front edge or a face that defines a thickness of the side face 52 faces the detachable member 32 and functions as a contact face 34 that comes into contact with the detachable member 32 in a frontal crash.

The cover body 30 includes, adjacent to the contact face 34, a plurality of (three in the illustrated example) projections 36 arranged vertically. The projections 36 are integrally molded with the cover body 30 and are disposed slightly further inward of the cover relative to the side face 52. In other words, the projections 36 are disposed at locations that do not interfere with the detachable member 32. Each projection 36 has, in a side view, an arc or wedge shape projecting forward of the vehicle. The front end of the projection 36 projects further forward of the vehicle relative to the contact face 34 located at the same height level. A narrow notch 40 is disposed between two adjacent projections 36. The notch 40 serves as an origin of cracks in a frontal crash, as will be described below. The cover body 30 further includes, adjacent of the front edge of the side face 52, an engage hole 38b which engages with a clip 42b.

The detachable member 32 is to be fastened to the front portion of the cover body 30. With the detachable member 32 being fastened to the cover body 30, a top face 60 and side faces 62 of the detachable member 32 are smoothly continuous with the top face 50 (more precisely, the front part 50f of the top face) and the side faces 52 of the cover body respectively.

The detachable member 32 includes a clip 42a extending downward from the top face 60. The clip 42a is to be inserted and fitted in the engage hole 38a of the coupling portion 58. The detachable member 32 further includes a clip 42b adjacent to the front edge, and the clip 42b is to be inserted and fitted in the engage hole 38b disposed adjacent to the front edge of the cover body 30.

The clips 42a and 42b may have any shape that can be fitted in the engage holes 38a and 38b. The clips 42a and 42b may therefore have a claw shape with a protruding edge as in snap-fitting connection. Fitting the clips 42a and 42b into the corresponding engage holes 38a and 38b prevents withdrawal of the detachable member 32 from the cover body 30. The clips 42a and 42b therefore function as fasteners that fasten the detachable member 32 to the cover body 30. As will be described in detail below, the detachable member 32 in this example moves upward and is withdrawn from the column cover 12 in a frontal crash. The clip 42a and 42b are inserted in the engage holes 38a and 38b downwardly which is opposite the withdrawing direction of the detachable member 32 in which the detachable member 32 is to be withdrawn, that is an upward direction.

As is clear from the above description, in this example, the upper column cover 26 is separable along the vehicle length into the cover body 30 and the detachable member 32, which are fastened together with the fasteners, the clips 42a and 42b. The reason such a configuration is adopted will be described below.

In the event of a frontal crash in which the front face of a vehicle impacts an obstacle, a front portion of the vehicle collapses to partially absorb the collision energy. Sufficient collapsing of the vehicle front portion causes the vehicle to stop, propelling an occupant forward due to an inertial force. A portion of this inertial energy from the occupant is absorbed by a seatbelt or an airbag, while the force of the occupant impacting the steering wheel is absorbed by the steering column which contracts or moves forward. A quantity of contraction or forward movement of the steering column for energy absorption is referred to as an "EA stroke".

Figure 8:
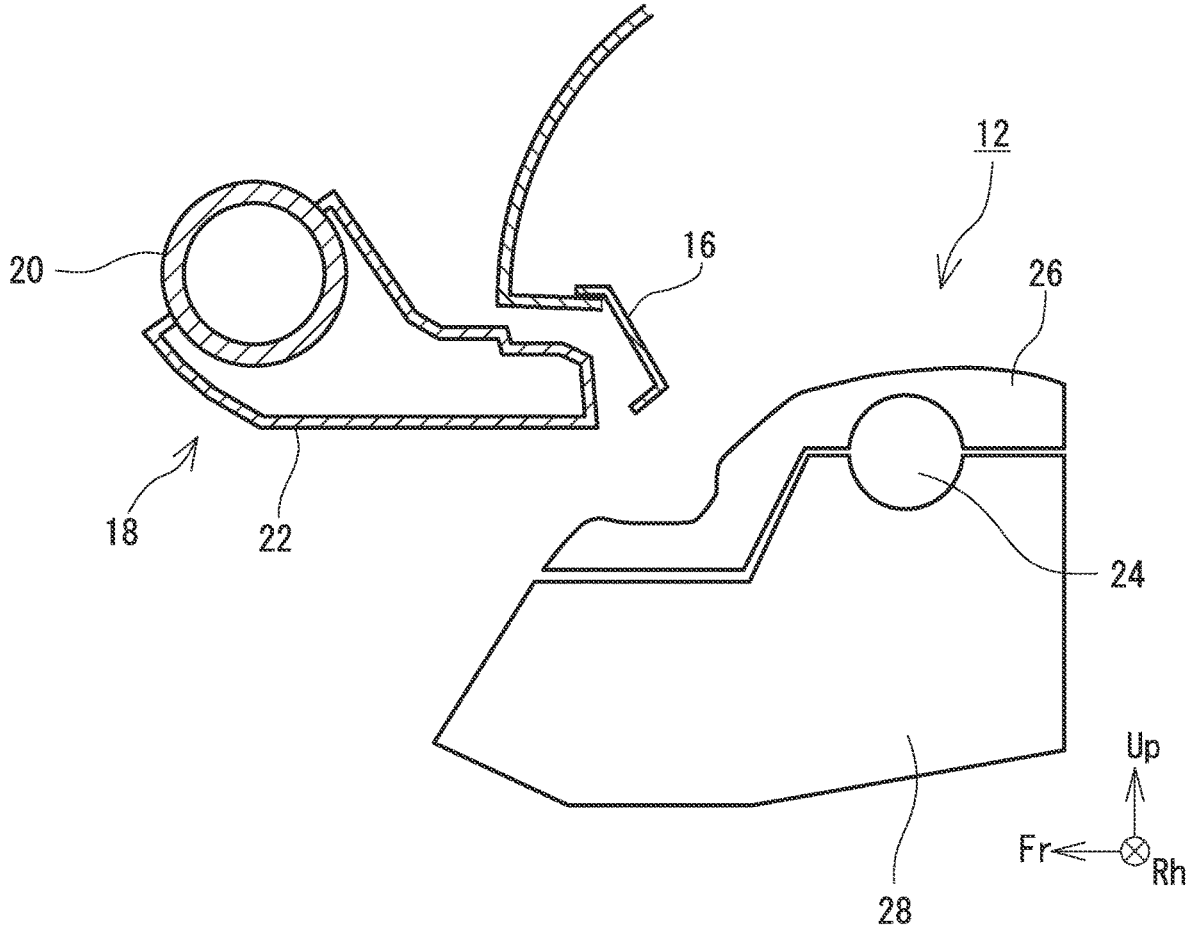
FIG. 8 illustrates the arrangement of a conventional instrument panel and a conventional instrument panel R/F.

To properly protect an occupant, it is necessary to secure space for the EA stroke behind the instrument panel R/F 18. Conventionally, the instrument panel 16 was often located above the column cover 12, as illustrated in FIG. 8. In this configuration, the instrument panel R/F 18 was also positioned above the column cover 12, facilitating securing of a space for the EA stroke behind the instrument panel R/F 18.

In recent years, however, there have been significant design changes in the area of the instrument panel 16, and a design in which the top face of the instrument panel 16 is continuous with the front part 50f of the top face of the column cover 12, as illustrated in FIG. 1, may be desired. Lowering the level of the top face of the instrument panel 16 as illustrated results, however, in lowering the level at which the instrument panel R/F 18 is disposed, such that the instrument panel R/F 18 may be positioned immediately forward of the column cover 12.

Such a configuration introduces the possibility that the instrument panel R/F 18 and the column cover 12 may not be sufficiently separated from each other. In the present example, to secure the EA stroke of the instrument panel R/F 18 which is not sufficiently separated from the column cover 12, the upper column cover 26 is longitudinally divided into two members, the cover body 30 and the detachable member 32, which are fastened together with fasteners.

Figure 4:
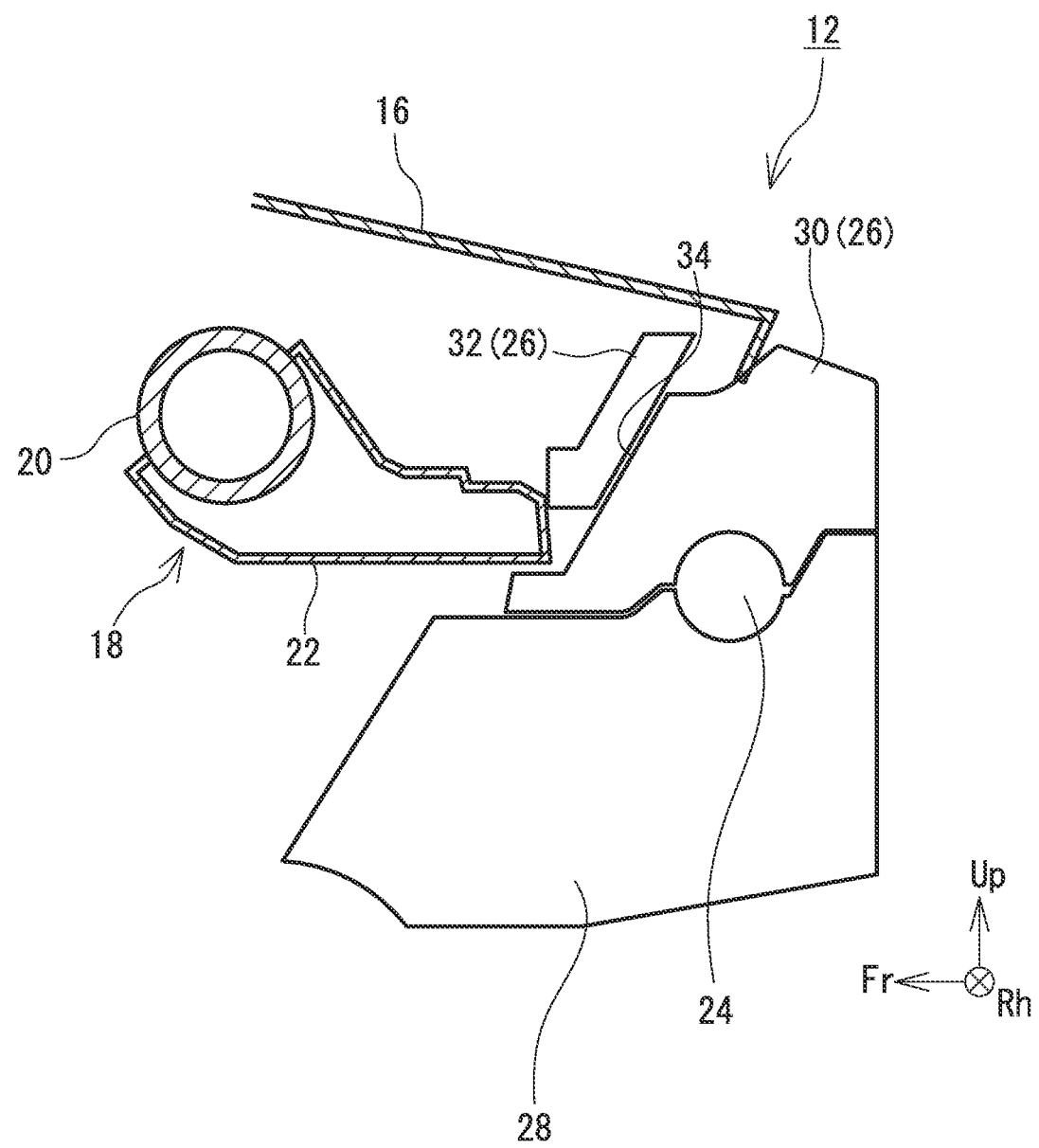
FIG. 4 is a side view of a column cover in a frontal crash.

Specifically, the fasteners, such as the clips 42a and 42b, would easily break and release the fastening with a relatively small force. Therefore, in a frontal crash, the instrument panel R/F 18 moving rearward and crashing against the detachable member 32 with a significant force would release fastening of the detachable member 32 with the clips 42a and 42b. This causes the detachable member 32 to be withdrawn from the upper column cover 26, as illustrated in FIG. 4. Withdrawal of the detachable member 32 from the upper column cover 26 allows the instrument panel R/F 18 to move rearward by a further amount corresponding to the longitudinal dimension of the detachable member 32. More specifically, in the present example, in a configuration in which the instrument panel R/F 18 and the detachable member 32 are not sufficiently apart from each other, the detachable member 32 is withdrawn from the upper column cover 26 in a frontal crash to secure the EA stroke of the instrument panel R/F 18 by a further amount corresponding to the dimension of the detachable member 32.

Further, in the present example, the cover body 30 includes the contact face 34 that is inclined upward and rearward. This configuration enables further reliable withdrawal of the detachable member 32. Specifically, upon receiving a collision load from the instrument panel R/F 18, the detachable member 32 impacts the contact face 34 of the cover body 30. The contact face 34 which is inclined upward and rearward applies a rearward and upward reaction force to the detachable member 32 contacting the contact face 34. Receiving this reaction force, the detachable member 32 slides rearward and upward along the contact face 34, which accelerates withdrawal of the detachable member 32 from the upper column cover 26.

The detachable member 32 is fitted with the cover body 30 via the clips 42a and 42b. However, the fitting direction of the clips 42a and 42b is downward that is opposite the withdrawing direction of the detachable member 32 or the upward direction, as described above. The detachable member 32 impacting the contact face 34 therefore releases fitting of the clips 42a and 42b easily. The release of the fitting of the clips 42a and 42b further allows the detachable member 32 to be withdrawn from the cover body 30 and move upward.

After the withdrawal of the detachable member 32, the steering column 10 moves forward to cause the front end of the cover body 30 to hit the instrument panel R/F 18. The instrument panel R/F 18 thus impacting the contact face 34 which is an inclined face may slide diagonally upward similar to the detachable member 32.

To avoid such sliding of the instrument panel R/F 18, in the present example, the cover body 30 includes the projections 36 at the same level as the instrument panel R/F 18. The projections 36 come into contact with the instrument panel R/F 18 before the contact face 34 contacts the instrument panel R/F 18 to catch the instrument panel R/F 18, thereby effectively avoiding upward sliding of the instrument panel R/F 18.

As described above, the acute notch 40 is disposed between two adjacent projections 36. A significant load input from the instrument panel R/F 18 to the projections 36 causes stress concentration in the notch 40, resulting in generation of cracks starting from the notch 40 that is an origin of the cracks. The generation of cracks accelerates brake of the cover body 30 integrally molded with the projections 36, which allows further rearward movement of the instrument panel R/F 18. This results in more effective absorption of collision energy to enable further reliable protection of the occupant.

As clearly described above, the technique in the present example enables securing of a sufficient EA stroke in a frontal crash in a configuration in which the instrument panel R/F 18 and the column cover 12 are not sufficiently apart from each other, leading to reliable protection of the occupant.

The configuration described above is an example. In any configuration including the column cover 12 having the cover body 30 and the detachable member 32 that is disposed in front of the cover body 30, is fastened to the cover body 30 with fasteners, and is located behind the instrument panel R/F 18 with an interval between the detachable member 32 and the instrument panel R/F 18, other modification may be appropriately made.

Figure 5:
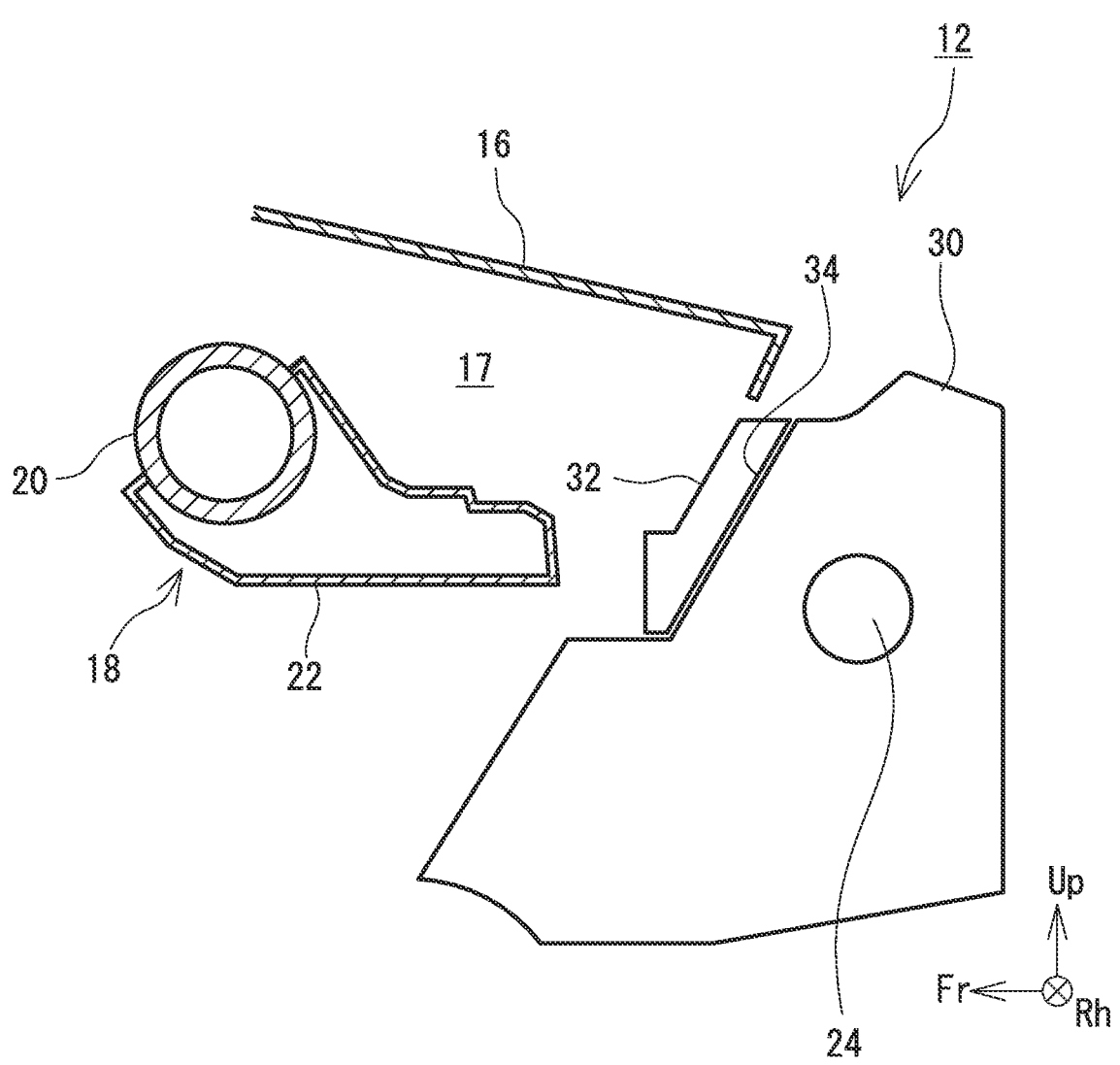
FIG. 5 illustrates another example column cover.
Figure 6:
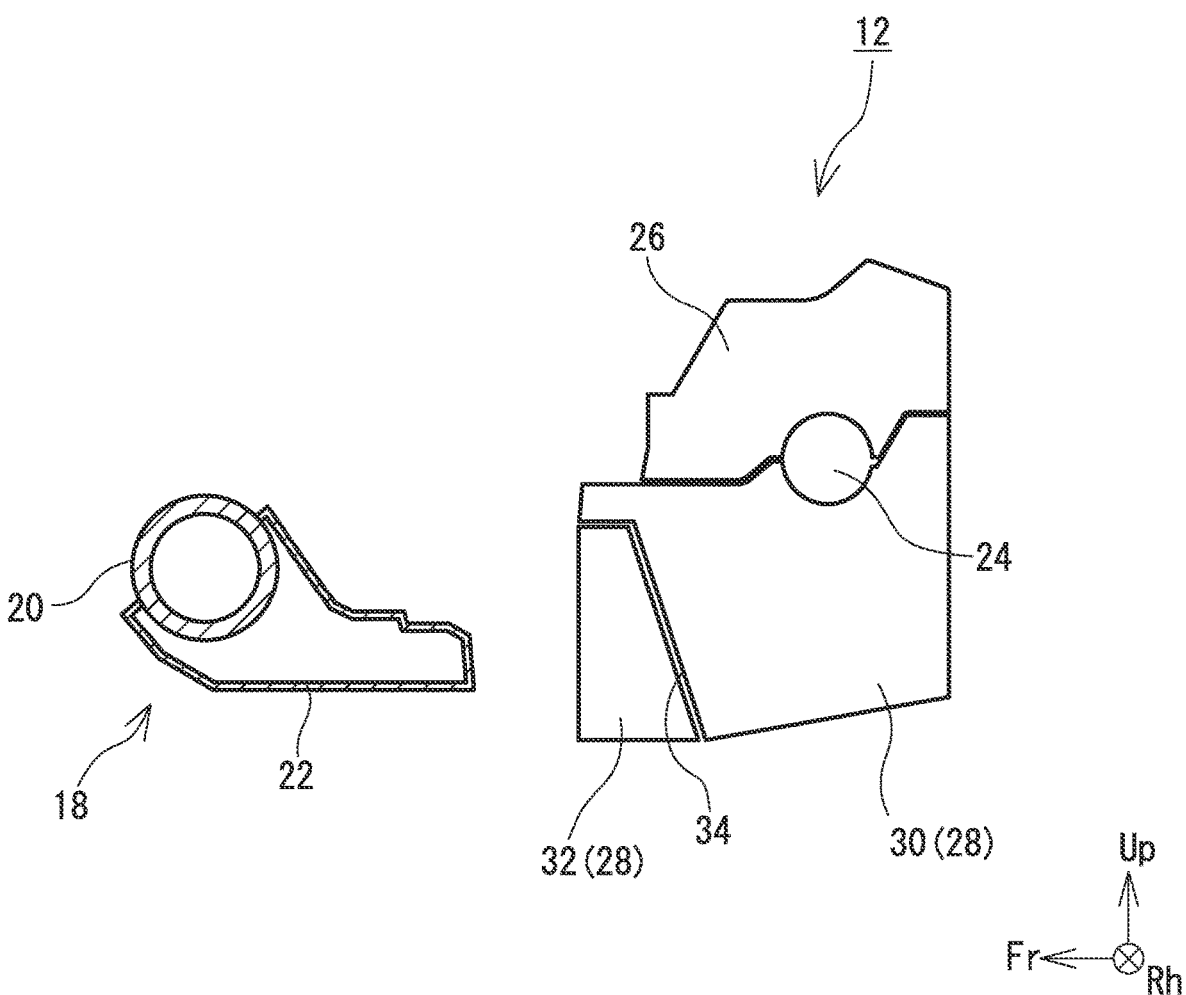
FIG. 6 illustrates a further example column cover.

In the above example, the column cover 12 is a vertically separable cover including the upper column cover 26 and the lower column cover 28; however, the column cover 12 may be an integral object. Specifically, a part of the integral column cover 12 is separated as the detachable member 32, as illustrated in FIG. 5. Further, although in the above example, the detachable member 32 is to be withdrawn upward, the detachable member 32 may be configured to be withdrawn downward as illustrated in FIG. 6. In this configuration, to avoid obstruction of downward withdrawal of the detachable member 32, no component of the column cover 12 is disposed below the detachable member 32. Further, in this configuration, the contact face 34 of the cover body 30 may be inclined rearward and downward to apply a downward reaction force to the detachable member 32.

Figure 7:
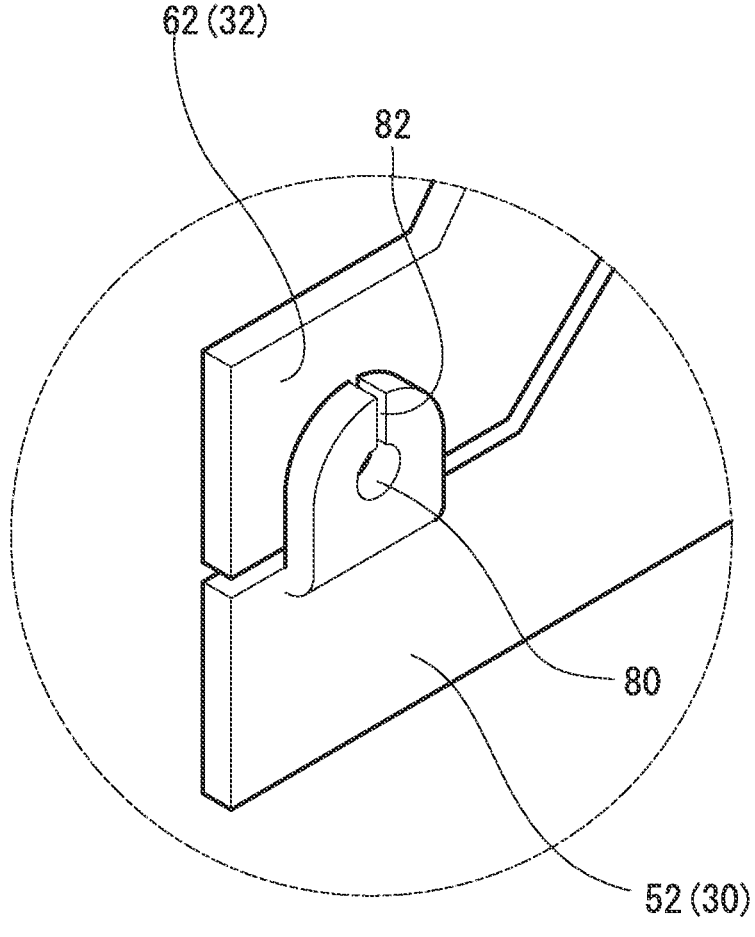
FIG. 7 is another example fastener.

In addition, although in the above example, the clips integrally molded with the detachable member 32 are used to fasten the cover body 30 and the detachable member 32, the configuration of the fastener may be modified as appropriate. For example, the cover body 30 and the detachable member 32 may be fastened together with clips that are completely separate from both the cover body 30 and the detachable member 32. Further, the cover body 30 and the detachable member 32 may be fastened with fasteners other than the clips, such as bolts and rivets, for example. In this configuration, to facilitate release of the fastening in a frontal crash, a brittle part may be disposed adjacent to the fastened portion. For example, the fastener may include a brittle part such as a cut portion 82 in the vicinity of a through hole 80 through which a bolt passes as illustrated in FIG. 7, to facilitate release of coupling with a force in the withdrawing direction.

REFERENCE SIGN LIST

10 steering column, 12 column cover, 14 steering wheel, 16 instrument panel, 17 instrument panel space, 20 pipe body, 22 auxiliary member, 24 lever hole, 26 column cover upper, 28 column cover lower, 30 cover body, 32 detachable member, 34 contact face, 36 projection, 38*a*, 38*b* engage hole, 40 notch, 42*a*, 42*b* clip, 56 hanging wall, 58 coupling portion.

The invention claimed is:

1. A column cover surrounding and covering a steering column, the column cover comprising:

a cover body; and a detachable member disposed further forward relative to the cover body, the detachable member being fastened to the cover body, with a fastener, to allow the detachable member to be continuous with the cover body, wherein the detachable member is disposed behind an instrument panel reinforcement and faces the instrument panel reinforcement with an interval along a length of a vehicle between the detachable member and the instrument panel reinforcement, no component of the column cover is disposed in at least one of a space above the detachable member or a space below the detachable member, the space corresponding to a space along a withdrawing direction of the detachable member, the cover body includes a contact face facing the detachable member, the contact face being inclined and configured to move the detachable member by applying a reaction force in the withdrawing direction in response to reception of a vehicle rearward force from the detachable member, and the detachable member including a top face and a pair of side faces each having a cantilevered connection to the top face and extending along the contact face of the cover body.

2. The column cover according to claim 1, wherein the column cover comprises:

a column cover upper including the cover body and the detachable member to form an upper part of the column cover; and a column cover lower forming a lower part of the column cover, and the contact face is inclined rearward and upward.

3. The column cover according to claim 2, wherein the fastener is a clip to be inserted and fitted in an engage hole disposed in at least one of the cover body or the detachable member, and the clip is inserted in the engage hole in a direction opposite the withdrawing direction.

4. The column cover according to claim 1, wherein the cover body comprises a plurality of projections protruding forward from a front end face of the cover body.

5. The column cover according to claim 4, wherein the plurality of projections are integrally molded with the cover body, and a narrow notch is disposed between two adjacent projections of the plurality of projections.

* * * * *